United States Patent [19]

Hackett

[11] Patent Number: 5,394,192
[45] Date of Patent: Feb. 28, 1995

[54] METHOD OF MEASURING THE NOISE IN AN ACTIVE VIDEO IMAGE AND DEVICE FOR IMPLEMENTING THE METHOD

[75] Inventor: Andrew Hackett, Goxwiller, France

[73] Assignee: Thomson Consumer Electronics, Courbevoie, France

[21] Appl. No.: 30,173

[22] PCT Filed: Sep. 27, 1991

[86] PCT No.: PCT/FR91/00756
  § 371 Date: Mar. 29, 1993
  § 102(e) Date: Mar. 29, 1993

[87] PCT Pub. No.: WO92/06558
  PCT Pub. Date: Apr. 16, 1992

[30] Foreign Application Priority Data
  Sep. 28, 1990 [FR] France ................. 90 11986

[51] Int. Cl.[6] ................ H04N 5/21; H04N 5/213
[52] U.S. Cl. ................ 348/619; 348/620
[58] Field of Search ............. 358/167, 36, 166, 37, 358/21 R, 105, 160; H04N 5/213, 9/64, 7/18, 5/21; 348/618, 619, 620

[56] References Cited

U.S. PATENT DOCUMENTS

| | | | |
|---|---|---|---|
| 4,249,209 | 2/1981 | Storey | 358/167 |
| 4,296,436 | 10/1981 | Achilla | 358/105 |
| 4,646,138 | 2/1987 | Willis | 358/36 |
| 4,679,086 | 7/1987 | May | 358/167 |
| 5,025,316 | 6/1991 | Darby | 358/167 |
| 5,140,424 | 8/1992 | Yoshimura et al. | 358/167 |
| 5,161,018 | 11/1992 | Matsunaga | 358/167 |
| 5,185,664 | 2/1993 | Darby | 358/167 |

*Primary Examiner*—James J. Groody
*Assistant Examiner*—Michael H. Lee
*Attorney, Agent, or Firm*—Oblon, Spivak, McClelland, Maier, & Neustadt

[57] ABSTRACT

A method of measuring the noise in an active video image. During a given processing period, for each pixel of a video image considered to be stationary, the difference $f_d$ between the video signal corresponding to this pixel and the video signal corresponding t the pixel at the same spatial position in a preceding image is calculated. The square of the absolute value of the difference is calculated so as to obtain a value $|f_d|^2$, and the value $|f_d|^2$ is added to previously obtained values so as to form a sum value $\Sigma|f_d|^2$. The above operations are repeated until the number of pixels processed is equal to a given threshold value $N_0$, or until the end of the processing period. At the end of the processing period, if the number of pixels processed is equal to the threshold value, the value $\Sigma|f_d|^2$ is used to determine a reference point giving a new noise-reduction coefficient $k_{min}$, otherwise the former reference point is kept. The invention applies especially to television.

11 Claims, 4 Drawing Sheets

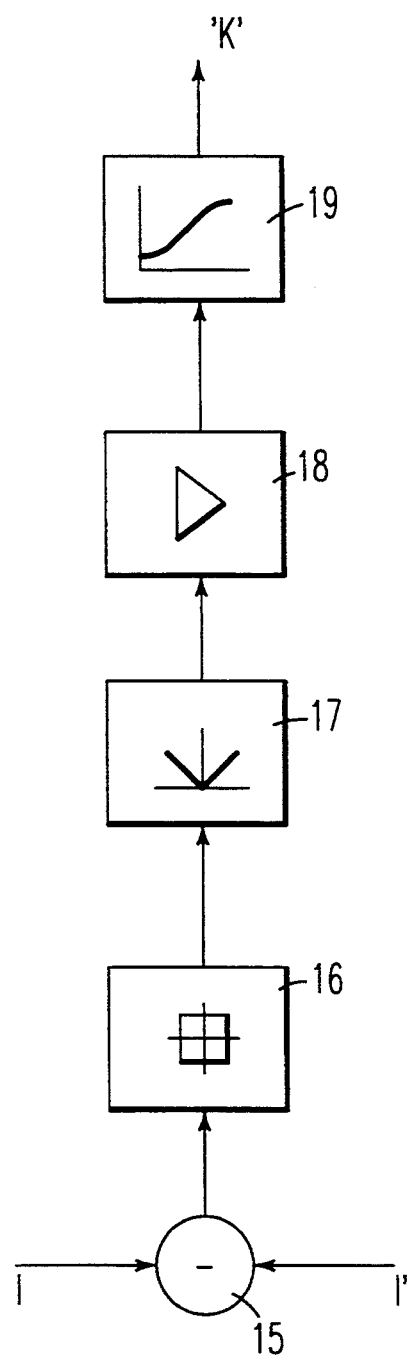
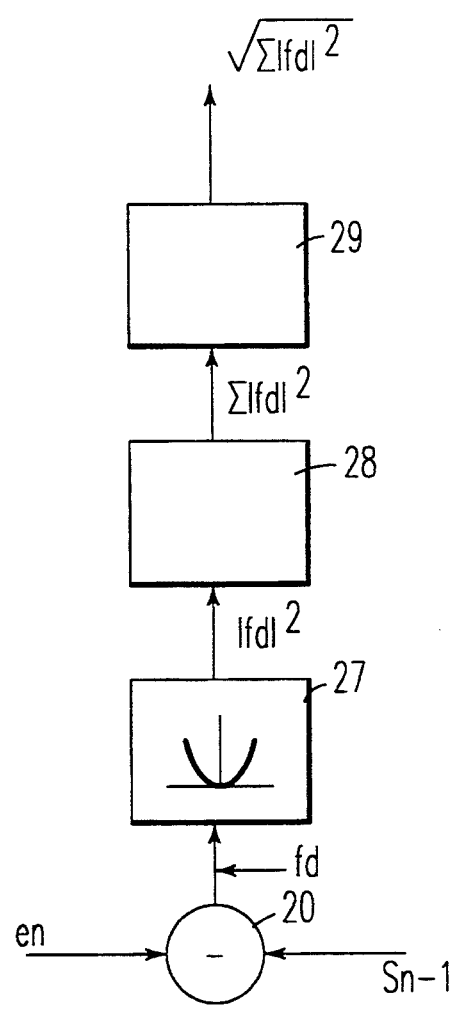
*FIG. 3*
*PRIOR ART*
*FIG. 5*

METHOD OF MEASURING THE NOISE IN AN ACTIVE VIDEO IMAGE AND DEVICE FOR IMPLEMENTING THE METHOD

SUMMARY OF THE INVENTION

1. Field of the Invention

The present invention relates to a method of measuring the noise in an active video image, the said method making it possible automatically to modify the value of the noise-reduction coefficient applied in the noise-reduction methods used in the processing of video images.

2. Discussion of the Background

Currently, in the processing of video images, various algorithms are used to bring about a noise reduction. These algorithms are divided into two main classes, namely the spatial algorithms which mainly include low-pass filtering, and the time domain algorithms which use frame or image storage. In the case where a time domain type noise-reduction algorithm is used for processing of a video signal, the latter can be implemented in a time domain recursive filter such as that represented in FIG. 1. This filter consists mainly of a multiplier 1 which receives at its input the video signal I and which multiplies it by a noise-reduction coefficient K. This noise-reduction coefficient K may take a value varying between 0 and 1. The output of the multiplier 1 is sent to a summer 2 which then adds a fraction of the video signal at the input to a signal coming from a multiplier 3. The multiplier 3 receives at its input the signal I′ coming from an image memory 4 which in fact corresponds to the signal coming from the summer 2 delayed by one image. The multiplier 3 then multiplies this signal I′ by a coefficient (1−K). The two coefficients applied to the multipliers 1 and 3 have a sum equal to 1 so as to keep a constant direct-current gain through the filter. The output of the summer 2 also makes it possible to obtain the video signal at the output S. When this filter is examined, it is seen that, if the noise-reduction coefficient K is equal to 1, the multiplier coefficient of the multiplier 3 is equal to 0, and, consequently, there is no feedback and no noise reduction. If the noise-reduction coefficient K is equal to 0, there is no input and a "frozen" image recirculates in the circuit, with a delay of one image. In fact, a noise reduction is brought about when K has a value lying between 0 and 1, i.e. when a fraction of the input signal is added to the signal recirculating through the circuit with a delay of one image. However, such a system, when it is used to reduce the noise in a television signal, exhibits a certain number of drawbacks. The main drawback resides in the fact that the moving parts of the image appear with a streaking phenomenon. In fact, for a small value of K giving rise to good reduction of the noise, the filter has a long pulse response and, consequently, the information in the filter needs several images to decrease.

In fact, if the only image degradations introduced by such a filter are produced when there is a movement in the signal, it is desirable to introduce a mechanism making it possible to detect the movement and to use it to prevent a detection of movement on the moving parts of the image. Such a system has been proposed and is represented, for example, in FIG. 2. This device therefore mainly comprises a subtracter 10 which receives the video signal I at its input and which substracts it from the video signal I′ coming from an image memory 13, this video signal I′ being the delayed signal corresponding to the previous processed image. The output of the subtractor 10 is sent to a multiplier 11 in order to be multiplied by the noise-reduction coefficient K coming from a movement detector 14. The output of the multiplier 11 is sent to a summer 12 which receives the video signal I′ coming from the image memory 13 on its other input. The output of the summer 12 is sent to the image memory 12 which delays the video signal by one processed image. On the other hand, the video signal S at the output comes from the output of the summer 12. As represented in FIG. 2, the detector 14 supplies the noise reduction coefficient K which it calculates by using both the input video signal I and the video signal I′ processed and delayed by one image.

The movement detector 14 consists of a set of circuits which supply at their output a value of K controlling the amount of noise reduction carried out. This detector must therefore distinguish between a movement, which is usually a coherent change between the images, and noise which is random. In order to do this, the movement detector carries out a certain number of operations, as represented in FIG. 3, allowing the coefficient K to be obtained. First of all, an image-difference signal is formed by subtracting, in the subtracter 15, on the basis of the pixel, the input video signal I and the video signal I′ delayed by one complete image period. The resulting difference signal is then spatially averaged over a window of dimensions N×M (typically 5 and 3), as represented in block 16. This operation allows the influence of the noise to be reduced. At this stage, certain indications relating to the movement are also reduced. The spatially averaged signal coming from block 16 is then rectified, as represented by block 17. A single-pole signal is thus obtained, representing the value and position of the moving parts in the image. This signal is multiplied by the loop gain as represented by block 18, and the resulting signal is limited to between 0 and 255, i.e. coded over 8 bits, and applied to a subjective transfer function as represented by block 19. The output of the subjective transfer function gives the value of K which is used in the time domain filter. The subjective transfer function as represented in block 19 is in fact chosen as a function of the size, of the spatial average and of the loop gain, in order to obtain a good compromise between the appearance of streaking due to a value of K too small for a movement and the necessity of keeping K small so as to obtain good reduction of the noise. Hence a transfer function is obtained which begins with a small value of K, and which then exhibits a rapidly increasing slope upon appearance of a particularly troublesome moiré effect, and which terminates at the value 1 for an abscissa value of 255. On the other hand, the loop gain represented by block 18 is a constant multiplicative factor applied at the output of the rectifier device and which can be adjusted so that the input of the transfer function occupies the whole range 0 to 255 for a complete range of movement, i.e. 0 when there is no movement and no noise up to 255 for a movement for which it is desirable that K=1.

The filter in FIG. 2 delivers a noise reduction in the processing of images including a great deal of noise. However, the process employed in this case is a compromise between the noise reduction and the streaking. Consequently, parasitics are necessarily introduced into the final image. However, it is desirable to introduce these parasitics when the video image is noise-free. In order to do this, it is therefore necessary to estimate the quantity of noise present in the input video signal and to reduce or increase the value of the noise-reduction coefficient as a function of this measurement. A novel method taking account of the measurement of the noise has already been proposed, especially in the U.S. Pat. No. 4,249,209.

SUMMARY OF THE INVENTION

Hence the object of the present invention is to provide a method of noise measurement in an active video signal which makes it possible to act on the value of the noise-reduction coefficient K coming from the movement detector, and which is simple to implement.

Consequently, the subject of the present invention is a method for adjusting the noise-reduction coefficient K in an active video image, characterised by the following steps:

during a given processing period, movement detection and noise measurement are carried out in parallel, the measurement of the noise being obtained for each pixel of a video image considered to be stationary by a movement detector processing successive images, by calculating the difference $f_d$ between the unprocessed video signal corresponding to this pixel, and the process video signal with the noise-reduction coefficient K corresponding to the pixel at the same spatial position in a preceding image;

by calculating the square of the absolute value of the difference so as to obtain a value $|f_d|^2$;

by adding the value $|f_d|^2$ to the other values $|f_d|^2$ already obtained for the pixels defined as stationary, so as to form a sume value $\Sigma |f_d|^2$;

and by recommencing the the above operations until the number pixels processed is equal to a given threshold value $N_0$, or until the end of the processing period, then at the end of the above operations, when the number of pixels processed is equal to the threshold value, the value $\Sigma |f_d|^2$ is used to determine the value of a reference point corresponding to the movement as a function of the noise, this value giving, as a function of a transfer curve in which the noise-reduction coefficient is a function of the values at the output of the movement detector, a new value for the noise-reduction coefficient K, otherwise the former value of the noise reduction coefficient is kept.

According to a preferred embodiment, the reference point giving a new noise-reduction coefficient is determined by taking the square root of the sum value divided by the threshold value $N_0$.

In the context of the present invention, the measurement of the noise is done within an active image. This measurement technique is based on the following idea: in the parts where the movement detector applies a maximum noise reduction to the image, the image is stationary, and consequently the differences between pixels in these parts are due mainly to the noise and not to the movement.

This assumption depends on the shape of the transfer function described above. However, the measurement inexactitudes are significant only in the case where the noise is very high and tends to indicate a higher noise level than that which is currently present. In fact, this measurement mode is generally compensated for, and does not affect the operation of the system.

Another subject of the present invention is a device for implementing the measurement method as described above.

According to another characteristic of the present invention, making it possible to weight the change in the noise-reduction coefficient, two threshold values $N_0$ and $N_1$ are used with $N_0 \geq N_1$. Hence, at the end of the processing period, the sum value $\Sigma |F_d|^2$ is used to determine a reference point giving, with the said transfer curve, a new noise-reduction coefficient $K_{min}$. The new value of the noise-reduction coefficient is compared to the current value of this coefficient. If this value is greater, the number of pixels processed is compared to the first threshold value $N_0$. If it is greater or equal, the new value of the noise-reduction coefficient is used, if not the former value is kept. If the value is lower, the number of pixels processed is compared to the second threshold value $N_1$. If it is greater or equal, the new value of the noise-reduction coefficient is used, otherwise the former value is kept.

BRIEF DESCRIPTION OF THE DRAWINGS

Other characteristics and advantages of the present invention will appear on reading the description given below of a preferred embodiment of the method and of the device, this description being given with reference to the attached drawings in which:

FIG. 5 is a diagram representing the various steps implemented for carrying out the measurement of the noise.

DESCRIPTION OF THE PREFERRED EMBODIMENTS

Figure 1:
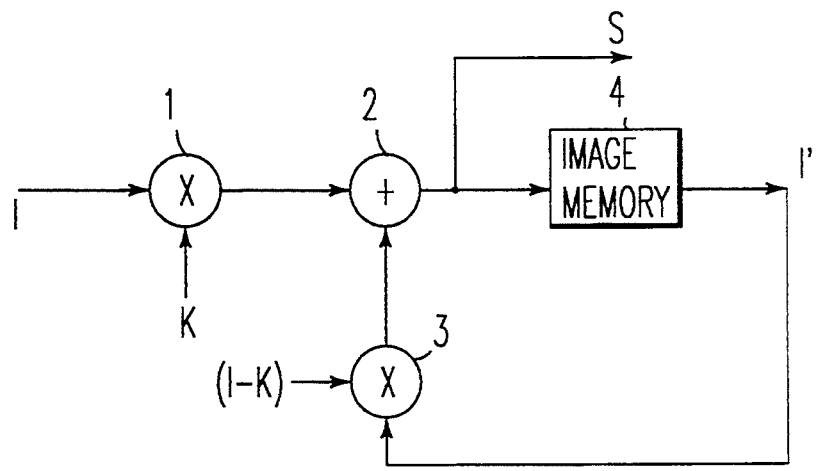
FIG. 1, already described, diagrammatically represents a time domain filter according to the prior art, FIG. 2, already described, diagrammatically represents an adaptive time domain filter according to the prior art, FIG. 3, already described, is a block diagram representing the operation of a movement detector according to the prior art.
Figure 2:
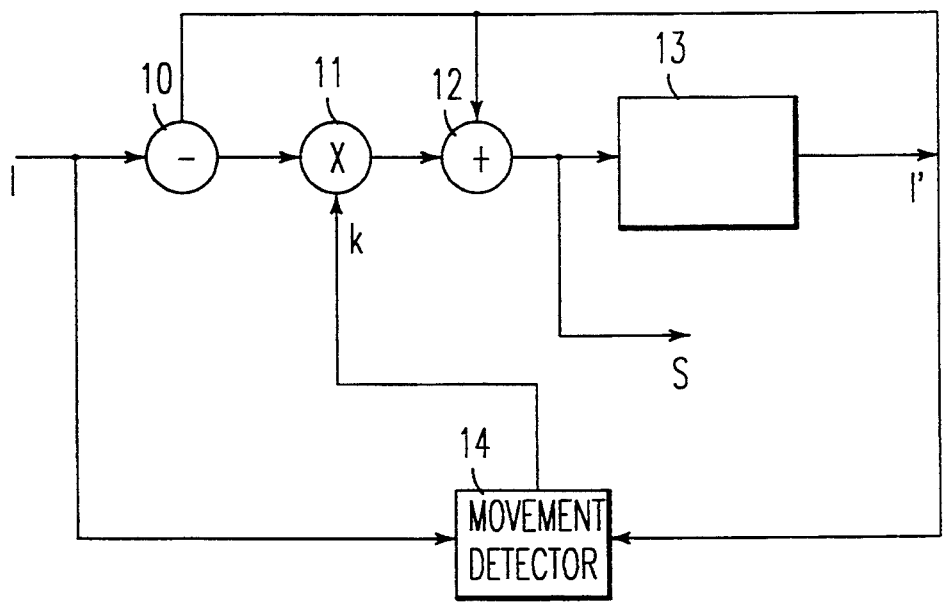
Figure 4:
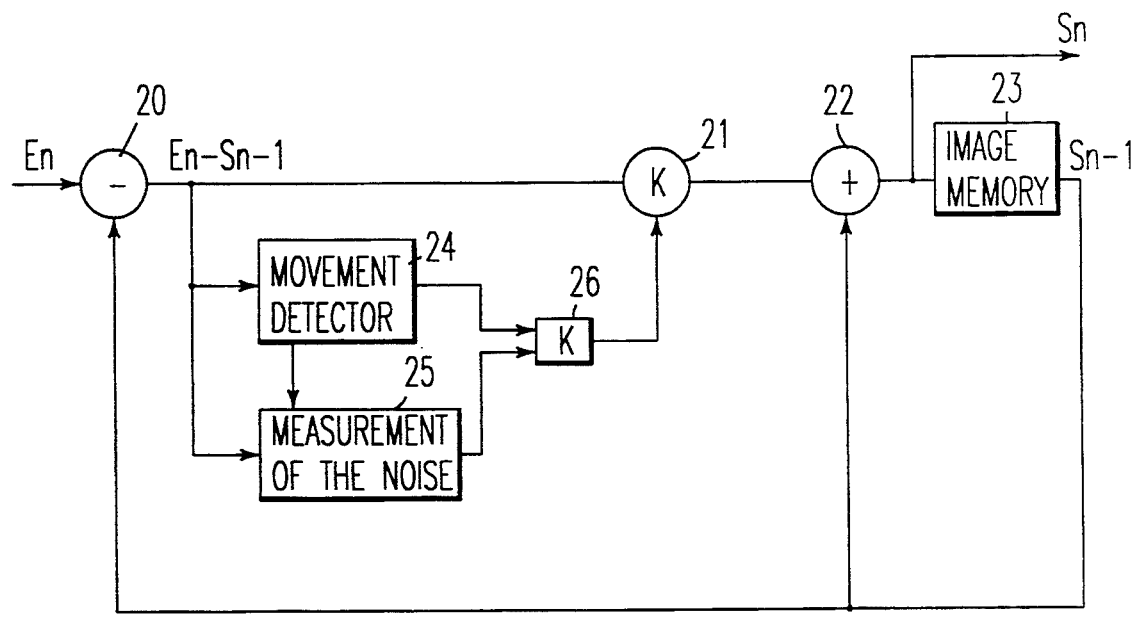
FIG. 4 is a diagram of a time domain filter according to the prior art.

As represented in FIG. 4, the time domain recursive filter includes a subtracter 20 which receives at its input the video signal En from which it subtracts the video signal Sn−1 of the preceding processed image coming from an image memory 23, as in the preceding embodiments. The signal En−Sn−1 at the output of the subtracter is sent to a multiplier 21, to a movement detector 24 and to a circuit for measurement of the noise 25. The movement detector 24 is identical to the movement detector used in the adaptive time domain filter of FIG. 2, and carries out the same operations as those described with reference to FIG. 3. On the other hand, the detector 24 sends a validation pulse to the measurement circuit 25 when it detects points considered to be stationary. In fact, the measurement of the noise, as explained below, is carried out in the device 25 on stationary points within an active image. The signals coming from the movement detector 24 and from the noise measurement circuit 25 are sent to the input of a summer 26 which gives, at its output, after passing through the transfer function represented by block 19 in FIG. 3, the value of K which is applied to the other input of the multiplier 21. Next, in a known way, the output of the multiplier 21 is sent to a summer 22 which receives, on its other input, the signal Sn−1 coming from the image memory 23. The output of the summer 22 is sent to the input of the image memory 23 and makes it possible directly to obtain the output video signal Sn.

The various steps of the noise measurement method implemented in the present invention will now be described by referring more particularly to the diagram of FIG. 5.

As represented in FIG. 5, for the pixels considered to be valid, namely the pixels which the movement detector 24 has signalled as being stationary, the difference signal $F_d$ coming from the subtracter 20 is sent to a circuit 27 which multiplies the absolute value of $F_d$ by itself so as to obtain as an output the signal $|F_d|^2$. This signal $|F_d|^2$ is sent to a circuit 28 which adds this value to the previously determined values. Hence at the output a value $\Sigma|F_d|^2$ is obtained. At the end of the measurement period, namely at the end of one image in the embodiment represented, the signal $\Sigma|F_d|^2$ is sent to a circuit 29 which takes the square root of it. On the other hand, a count has been carried out of the pixels or image points used in this calculation during the processing period. If this count is greater than or equal to a certain predetermined threshold value $N_0$, the value obtained at the output is used as new reference point for calculating the value of the noise-reduction coefficient K in the circuit 26. If the number of pixels is less than the said threshold value, the former value is used as the noise-reduction coefficient K.

Figure 6:
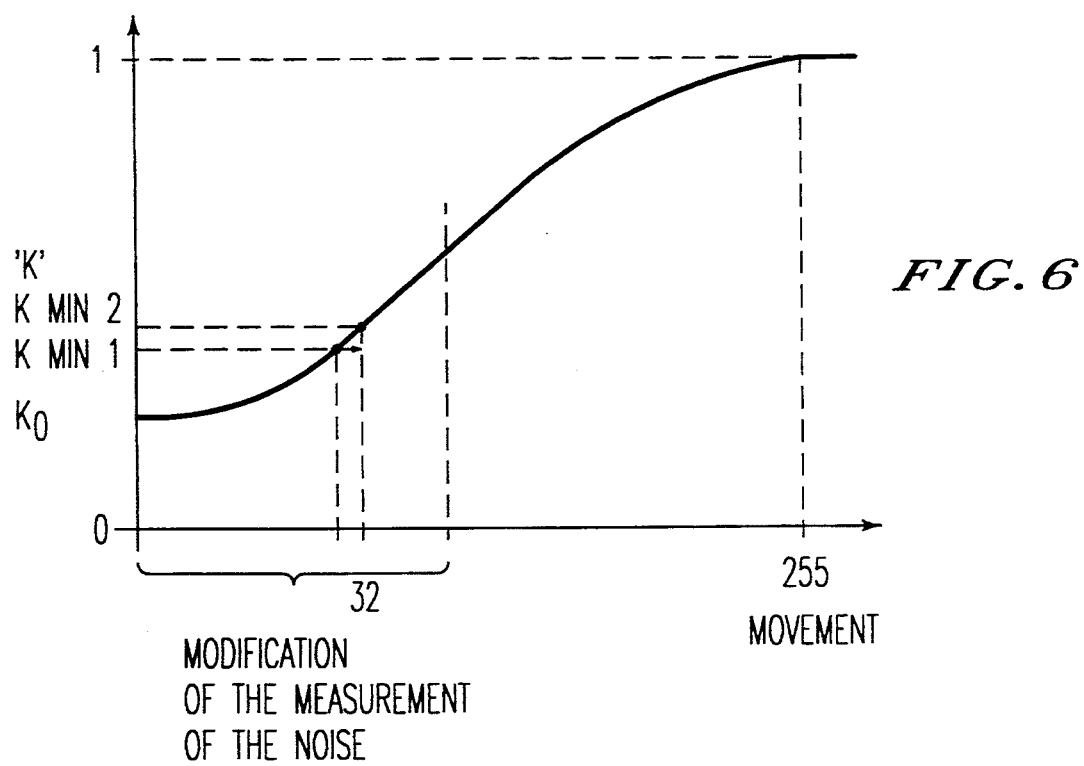
FIG. 6 is a curve giving the value of K as a function of the movement.

The circuit 25 for measurement of the noise thus makes it possible to obtain an estimate of the noise present in the image. This estimate is used to modify the amount of noise reduction carried out on the image by applying it in the circuit 26. The way in which this estimate is used will be explained by referring more particularly to FIG. 6, which represents a particular shape of a transfer function which can be used in a movement detector in accordance with the present invention. In this case, the vertical axis represents the noise-reduction coefficient K used in the recursive filter. It may take a value lying between 0 and 1. The horizontal axis represents the output of the movement detector. The values at the output of the movement detector are coded between 0 and 255, and the values greater than 255 are limited to 255 in such a way as to carry out coding over 8 bits. As represented in FIG. 6, the output of the movement detector for a perfectly static noise-free source is 0. This point is called the reference point. With a conventional movement detector, when the value of the movement increases, the operating point moves to the right from the reference point, and the value of K increases.

In fact, in accordance with the present invention, the measurement of the noise coming from the circuit 25 is used to modify the value of the reference point. The output of the circuit 25 gives a movement value between, for example, 0 and 31, 31 being the maximum value considered for a noise-free image. This value of the movement obtained at the output corresponds to a value $K_{min1}$ which is considered in fact to be the minimum noise-reduction coefficient which should be applied to the video image. As a function of the value coming from the circuit for measurement of the noise, a new reference point is positioned corresponding to the reference point used when the circuit for measurement of the noise indicates the noise-free image. When the measured noise decreases, the reference point moves to the right, as represented in FIG. 6, so as to give another value of the noise-reduction coefficient $K_{min2}$. When the measured noise increases, the reference point moves to the left until it reaches 0. Hence, a greater noise reduction is obtained for noisy sources than for low-noise sources, as is a reduction of the parasitics introduced into the noise-free sources.

In fact, the method described above makes it possible to carry out a significant noise reduction from a noisy signal, whereas it minimises the quantity of parasitics introduced into a clean signal.

Moreover, the precise shape of the transfer function, of which one embodiment is represented in FIG. 6, has a significant affect on the subjective effects of the noise reduction. This also depends on the size of the spatial filter, on the loop gain and on the operating point given by the noise measurement circuit.

Figure 7:
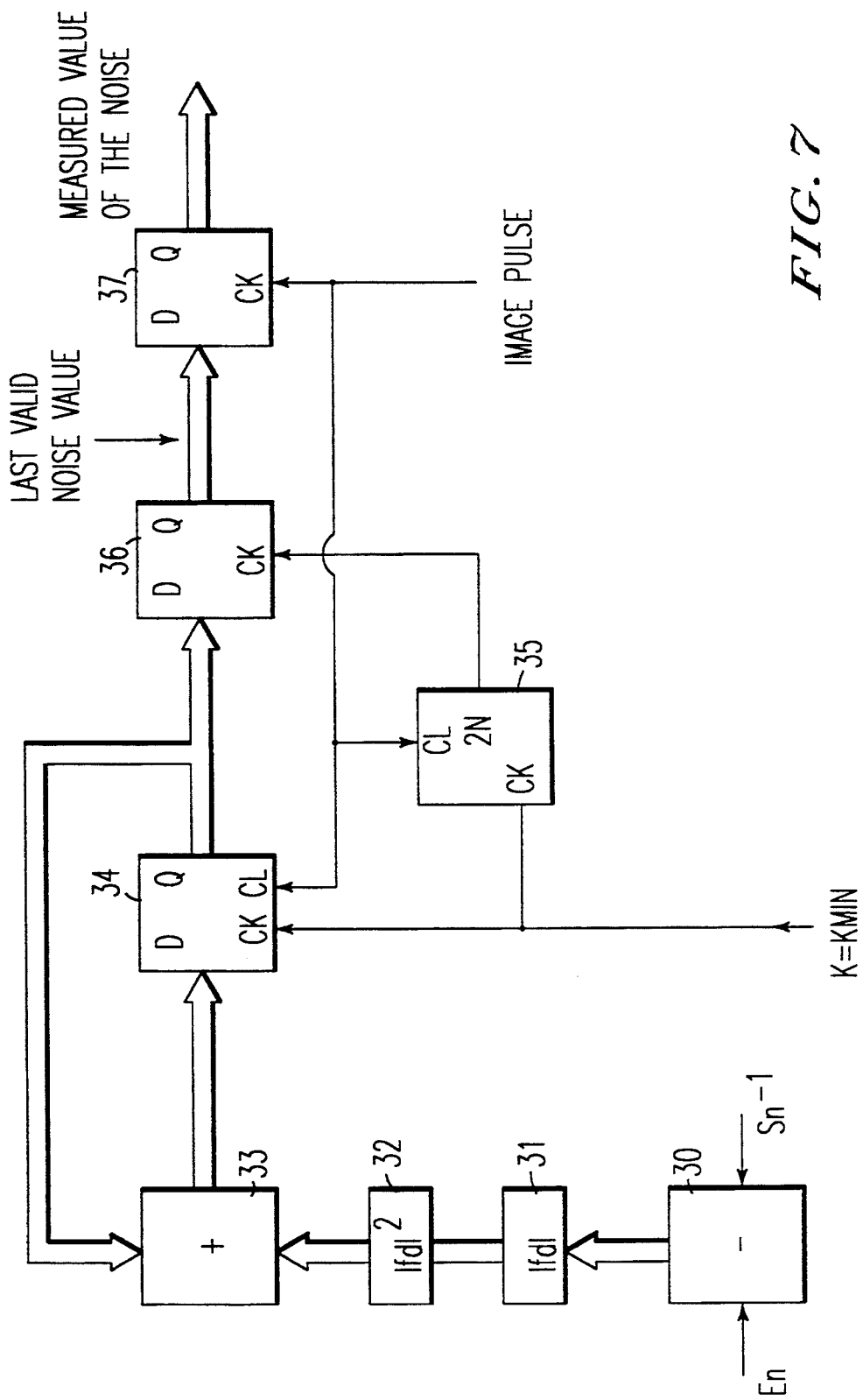
FIG. 7 is a diagrammatic representation of a circuit for implementing the method of the present invention.

One embodiment of a circuit making it possible to produce block 25 in FIG. 4 will now be described with reference to FIG. 7. In fact, the method of measuring the noise described above necessitates mathematical operations which are relatively complex to carry out with electronic circuits. Although the result of the calculation is given only 25 time domains per second, since the processing period generally used is one image, the averaging process has to operate at video speeds. In consequence, the circuit of FIG. 7 is a simplified circuit which makes it possible simply to calculate the value of the noise in a stationary image. As represented in FIG. 7, the image-difference signal is generated, as for the movement detector, by subtracting, in the subtracter 30, the video input signal En and the video signal delayed by one frame Sn−1 coming from an image memory. The difference signal is digitized with at most 8-bit precision in the embodiment represented. The output signal of the subtracter 30 is sent to an absolute-value circuit 31, then multiplied by itself in a circuit 32 in order to obtain the signal $|F_d|^2$ at the output. Next the output of the circuit 32 is sent to the input of an accumulator. This accumulator consists of a summer 33 and a D flip-flop 34. The summer 33 receives the output of the circuit 32 which it adds to the output of the D flip-flop 34. On the other hand, the D flip-flop 34 is enabled by a clock signal CK which sends a pulse when the signal K coming from the movement detector is equal to Kmin, that is to say when the pixels in question are static. This accumulator contains a number of bits, namely M bits, sufficient to avoid any overflow for $2^N$ samples. On the other hand, when the D flip-flop receives a clock pulse, this clock pulse is sent simultaneously to the input of a counter 35 so as to increment it by 1. If the counter 35 reaches a threshold value, namely $2^N$ in the embodiment represented, this value is sent as a clock signal to a flip-flop 36. This D flip-flop 36 receives at its input the value coming from the flip-flop 34 and keeps it as a measurement of the noise which is valid for the following image. If the counter 35 does not reach the threshold value, no clock pulse is sent to the flip-flop 36, which keeps the last value as a valid noise measurement. The bits which are sent from the flip-flop 34 to the flip-flop 36 are the most significant bits M-N-D representing a division by $2^N$ so as to obtain an average noise value, and also a division by D so that the measurement of the noise lies within a correct operating range, namely between 0 and 31 in the embodiment represented. The output of the D flip-flop 36 is sent to a D flip-flop 37 which gives the value of the measured noise at its output. On the other hand, the flip-flops 34 and 37, as well as the counter 35, are reset to zero by sending a pulse to the CL inputs at the end of each processing period, i.e. at the end of each image.

If the threshold value is equal to an integer which is a power of 2, in this case the division and the average can be obtained simply by removing the least significant bits of the accumulated result.

What is claimed as new and desired to be secured by Letters Patent is:

1. Method of adjusting a noise-reduction coefficient K in an active video image, characterised by the following steps:

during a given processing period, detecting movement and measuring noise in the video image in parallel, a measurement of the noise being obtained for each pixel of the video image considered to be stationary, using a movement detector processing successive images, by calculating a difference $f_d$ between an unprocessed video signal corresponding to this pixel, and a video signal processed with a noise-reduction coefficient K corresponding to the pixel at a same spatial position in a preceding video image;

calculating the square of the absolute value of the difference so as to obtain a value $|f_d|^2$;

adding the value $|f_d|^2$ to other values $|f_d|^2$ already obtained for the pixels defined as stationary, so as to form a sum value $\Sigma|f_d|^2$;

recommencing the above operations until a number of pixels processed is equal to a first threshold value $N_0$, or until the end of the processing period;

at the end of the above operations, when the number of pixels processed is at least equal to the first threshold value, using the sum value $\Sigma|f_d|^2$ to determine a value of a reference point corresponding to the movement as a function of the noise, this value giving as a function of a transfer curve in which the noise-reduction coefficient is a function of the values at the output of the movement detector, a new value for the noise-reduction coefficient K, otherwise a former value of the noise-reduction coefficient K is kept; and using the value determined as the noise-reduction coefficient K to reduce noise in the unprocessed video image to produce a noise-reduced video image.

2. Method according to claim 1, wherein said step of using said sum value comprises:

at the end of the processing period, using the sum value $\Sigma|f_d|^2$ to determine a reference point giving, with the said transfer curve, a new value of the noise-reduction coefficient K;

comparing the new value of the noise-reduction coefficient K to a current value of the noise-reduction coefficient K;

if the new value is greater than the current value, comparing the number of pixels processed to the first threshold value $N_0$ and, if the number of pixels processed is greater or equal to $N_0$, using the new value of the noise-reduction coefficient K, otherwise using the current value; and if the new value is lower than the current value, comparing the number of pixels processed to a second threshold value $N_1$ and, if the number of pixels processed is greater or equal to $N_1$, using the new value of the noise-reduction coefficient K, otherwise using the current value.

3. Method according to either of claims 1 or 2, characterised in that the reference point giving a new reduction coefficient of the noise is determined by taking the square root of the value $\Sigma|f_d|^2$.

4. Method according to either of claims 1 or 2, characterised in that the reference point giving a new reduction coefficient of the noise is determined by taking the mean value of the value $\Sigma|f_d|^2/N_0$, $N_0$ being the threshold value.

5. Method according to any one of claims 1 or 2, characterised in that the first threshold value is an integer power of two ($2^N$).

6. Method according to any one of claims 1 or 2, characterised in that the processing period corresponds to at least one video image.

7. An apparatus for reducing noise in an active video signal, comprising:

means for receiving said video signal and subtracting a previous video signal of a image preceding said active video signal to produce a first signal;

a movement detector which receives said first signal and outputs a movement signal;

a noise measurement circuit for measuring noise in said first signal and for outputting a noise signal;

means for producing a noise-reduction coefficient using said movement signal and said noise signal;

a multiplier which multiplies said first signal and said noise-reduction coefficient to produce a second signal; and an adder for adding said second signal and said previous video signal to output a third signal being a noise-reduced video signal;

wherein said noise circuit measurement circuit comprises:

an absolute value circuit for taking the absolute value of said first signal and producing an absolute value signal;

a squaring circuit for squaring said absolute value signal and producing a squared signal;

an accumulator which adds said squared signal to previously produced squared signals and produces an accumulated signal;

a counter for counting a number of squared signals accumulated by said accumulator; and means for comparing said number of squared signals to a predetermined number, outputting said accumulated signal when said number of squared signals is at least equal to said predetermined number, and outputting a previous value of said accumulated signal when said number of squared signals is less than said predetermined number.

8. An apparatus as recited in claim 7, further comprising:

a memory, connected to said means for receiving said video signal and said adder, for storing said previous video signal.

9. An apparatus as recited in claim 7, wherein said movement detector further comprises:

means for detecting stationary pixels in said first signal; and means for outputting a fourth signal to said noise measurement circuit after detecting said stationary pixels in said first signal.

10. A method of reducing noise in an active video image, comprising:

storing a first video signal of a first image;

subtracting said first video signal from a second video signal of a second image subsequent to said first image to obtain a subtracted image;

detecting movement in said subtracted image to obtain stationary pixels in said subtracted image;

measuring noise in said subtracted image using said stationary pixels;

determining a noise-reduction coefficient based on said detecting of said movement and said measuring of said noise;

multiplying said subtracted image by said noise-reduction coefficient to obtain a multiplied signal; and producing a noise-reduced video signal from said first signal and said multiplied signal;

wherein said step of measuring noise in said subtracted image comprises:
  determining a first noise-reduction coefficient;
  counting a number of said stationary pixels;
  comparing said number to a predetermined value;
  using said first noise-reduction coefficient when said number is at least equal to said value; and
  using a previously determined noise-reduction coefficient when said number is less than said value.

11. A method of reducing noise in an active video image, comprising:

storing a first video signal of a first image;

subtracting said first video signal from a second video signal of a second image subsequent to said first image to obtain a subtracted image;

detecting movement in said subtracted image to obtain stationary pixels in said subtracted image;

measuring noise in said subtracted image using said stationary pixels;

determining a noise-reduction coefficient based on said detecting of said movement and said measuring of said noise;

multiplying said subtracted image by said noise-reduction coefficient to obtain a multiplied signal; and producing a noise-reduced video signal from said first signal and said multiplied signal;

wherein said step of measuring noise in said subtracted image further comprises:
  determining a first noise-reduction coefficient;
  counting a number of said stationary pixels;
  comparing said first noise-reduction coefficient to a previously determined second noise-reduction coefficient;
  if said first noise-reduction coefficient is greater that said second noise-reduction coefficient, comparing said number of said stationary pixels to a first threshold value, using said first noise-reduction coefficient when said number is at least equal to said first threshold, and using said second noise-reduction coefficient otherwise; and
  if said first noise-reduction coefficient is no more than said second noise-reduction coefficient, comparing said number of said stationary pixels to a second threshold value, using said first noise-reduction coefficient when said number is at least equal to said second threshold, and using said second noise-reduction coefficient otherwise.

* * * * *